(12) United States Patent
Andre et al.

(10) Patent No.: US 7,316,403 B2
(45) Date of Patent: Jan. 8, 2008

(54) HYDROSTATIC WORKPIECE HOLDER WITH A REMOVABLE CARTRIDGE ASSEMBLY

(76) Inventors: William M. Andre, 955 Dressler, Rochester Hills, MI (US) 48307; Bruce W. Irwin, Sr., 606 S. Ocean Dr., Ft. Pierce, FL (US) 34949

( * ) Notice: Subject to any disclaimer, the term of this patent is extended or adjusted under 35 U.S.C. 154(b) by 335 days.

(21) Appl. No.: 11/020,818

(22) Filed: Dec. 22, 2004

(65) Prior Publication Data
US 2006/0131820 A1    Jun. 22, 2006

(51) Int. Cl.
B23B 31/30    (2006.01)
(52) U.S. Cl. .................. 279/4.03; 279/2.08; 269/22
(58) Field of Classification Search ...... 279/2.06–2.09, 279/4.03–4.05; 269/22; B23B 31/30
See application file for complete search history.

(56) References Cited

U.S. PATENT DOCUMENTS

| | | | |
|---|---|---|---|
| 2,744,756 A | 5/1956 | Atherholt, Sr. et al. | |
| 2,797,604 A | 7/1957 | Atherholt et al | |
| 2,829,899 A | 4/1958 | Drew et al. | |
| 2,896,954 A | 7/1959 | Ernest | |
| 3,025,072 A | * 3/1962 | Cahill | 279/4.05 |
| 3,030,120 A | 4/1962 | Atherholt, Sr. | |
| 3,335,569 A | 8/1967 | Atherholt, Sr. | |
| 3,360,276 A | 12/1967 | Peffer | |
| 3,448,988 A | 6/1969 | Athanasiou | |
| 3,497,226 A | 2/1970 | Hohwart et al. | |
| 3,637,156 A | 1/1972 | Shepherd | |
| 3,638,979 A | 2/1972 | Francois et al. | |
| 3,677,559 A | 7/1972 | Andre et al. | |
| 3,761,008 A | 9/1973 | Goulder | |
| 3,829,147 A | 8/1974 | Ryswick | |
| 3,910,098 A | 10/1975 | Tailhardat | |
| 3,999,769 A | 12/1976 | Bayer et al. | |
| 4,094,104 A | 6/1978 | Zerhafs et al. | |
| 4,284,283 A | 8/1981 | Stermann | |
| 4,422,653 A | 12/1983 | Piotrowski | |
| 4,502,703 A | 3/1985 | Rohm | |
| 4,570,950 A | 2/1986 | Morawski et al. | |
| 4,694,559 A | 9/1987 | Lundy et al. | |

(Continued)

FOREIGN PATENT DOCUMENTS

GB    2 025 278    1/1980

(Continued)

Primary Examiner—Monica Carter
Assistant Examiner—Eric A. Gates
(74) Attorney, Agent, or Firm—Reising, Ethington, Barnes, Kisselle, P.C.

(57) ABSTRACT

A workpiece holding apparatus comprises a body, a cartridge assembly carried by the body and a sleeve. The cartridge assembly comprises at least one sealing member and a bladder supported by a retainer and at least partially defining a fluid chamber that houses a pressurized fluid. At least one annular seal is axially provided between the bladder and the sealing member(s). The annular seal(s) correspond with a sealing member, which engages the annular seal(s) upon adjustment of the sealing member. A seal is formed between the sealing member and the bladder that prevents fluid from escaping the fluid chamber. The annular, cylindrical sleeve engages a workpiece when the fluid chamber houses a pressurized fluid, which exerts a radial force against the bladder to the sleeve and into engagement with the workpiece.

24 Claims, 3 Drawing Sheets

U.S. PATENT DOCUMENTS

| | | |
|---|---|---|
| 4,724,595 A | 2/1988 | Snyder |
| 4,811,962 A | 3/1989 | Cameron, Jr. |
| 4,979,853 A | 12/1990 | Field |
| 5,088,746 A | 2/1992 | Dietz et al. |
| 5,286,042 A | 2/1994 | Laube |
| 5,516,243 A | 5/1996 | Laube |
| 5,711,538 A | 1/1998 | Retzbach et al. |
| 5,944,325 A | 8/1999 | Schmeisl |
| 6,000,687 A | 12/1999 | Andre |
| 6,015,154 A | 1/2000 | Andre et al. |
| 6,077,003 A | 6/2000 | Laube |
| 6,179,530 B1 | 1/2001 | Retzbach |
| 7,147,232 B2 * | 12/2006 | Andre, Sr. .................. 279/2.05 |
| 2003/0001345 A1 | 1/2003 | McFadden |
| 2004/0262855 A1 | 12/2004 | Andre |

FOREIGN PATENT DOCUMENTS

WO     WO 2070177 A2 *   9/2002

* cited by examiner

HYDROSTATIC WORKPIECE HOLDER WITH A REMOVABLE CARTRIDGE ASSEMBLY

FIELD OF THE INVENTION

The present invention relates to machine tools and, more specifically, to a hydrostatic workpiece holder.

BACKGROUND OF THE INVENTION

Hydrostatic workpiece holders utilize hydrostatic pressure to expand a metal sleeve, which exerts a holding pressure on a workpiece. U.S. Pat. No. 6,015,154 discloses a hydrostatic holding device comprising a fluid chamber defined, at least in part, by a bladder or bladder. The bladder separates the fluid in the chamber from the sleeve and prevents the fluid in the chamber from escaping. While the device is effective and reliable as a workpiece holder, improvements are necessary to reduce leakage from the fluid chamber and further to increase the performance and durability of the device.

SUMMARY OF THE INVENTION

The present invention provides a hydrostatic workpiece holding apparatus comprising a body, a cartridge assembly carried by the body and a sleeve. The cartridge assembly comprises a bladder, a retainer supporting the bladder, a fluid chamber that houses a fluid, at least one sealing member and at least one annular seal between the bladder and the sealing member(s). Each annular seal corresponds with one sealing member, where the sealing member engages the bladder by force exerted on the annular seal(s) and the bladder from adjusting the sealing member. A seal is formed between the sealing member(s) and the bladder that prevents the fluid from escaping the fluid chamber. When the fluid is pressurized, a radial force is exerted against the bladder to force the sleeve into firm and frictional engagement with a workpiece. The workpiece is then ready for machining or other similar workpiece treatment processes.

In a first embodiment of the present invention, the workpiece holder is a hydrostatic chuck comprising a body, a sleeve and a first design of a cartridge assembly. The cartridge assembly comprises a bladder, a retainer supporting the bladder, a fluid chamber for housing a fluid, at least one sealing member and at least one annular seal between the bladder and the sealing member(s). The sealing member(s) comprises a transversely extending leg portion that contacts the annular seal(s) and a body portion that has a threaded end for joining the sealing members together. When the sealing members are joined together and tightened, axial force is exerted on the bladder, whereby the sealing member(s) engages the annular seal(s) causing the annular seal(s) to flatten. Seals are, thus, created between the sealing member(s) and the bladder to prevent fluid from escaping the fluid chamber. The cartridge assembly of the first embodiment of the present invention is configured to exert a radially inward force against the sleeve of the hydrostatic chuck for firm, frictional engagement of the sleeve with a workpiece.

In a second embodiment of the present invention, the workpiece holder is a hydrostatic chuck comprising a second design of a cartridge assembly. The cartridge assembly comprises a bladder, a retainer supporting the bladder, a fluid chamber for housing a fluid, at least one sealing member, at least one annular seal between the bladder and the sealing member(s), at least one end plate, at least one fastener and at least one set screw. In this design of the cartridge assembly, the sealing member(s) is an annular plate, adjustably incorporated within the cartridge assembly between the annular seal(s) and the end plate(s) by the set screw(s). When the set screw(s) is tightened, axial force is exerted on the sealing member(s) and, thus, exerted on the annular seal(s). Then, the sealing member(s) engages the annular seal(s) causing the annular seal(s) to flatten. Seals are, thus, created between the sealing member(s) and the bladder to prevent fluid from escaping the fluid chamber. Like that of the first embodiment, the cartridge assembly of the second embodiment is also configured to exert a radially inward force against the sleeve of the hydrostatic chuck for firm, frictional engagement of the sleeve with a workpiece.

In a third embodiment of the present invention, the workpiece holding apparatus is a hydrostatic arbor comprising a body, a sleeve and a cartridge assembly that is substantially similar to the first design of the cartridge assembly of the first embodiment. In the arbor design of the third embodiment, the cartridge assembly is configured to exert a radially outward force against the sleeve of the arbor for firm, frictional engagement of the sleeve with a workpiece.

In a fourth embodiment of the present invention, the workpiece holding apparatus is a hydrostatic arbor comprising a cartridge assembly that is substantially similar to the second design of the cartridge assembly of the second embodiment. Again, as in the third embodiment, the second design of the cartridge assembly for the fourth embodiment is configured to exert a radially outward force against the sleeve of the arbor for firm, frictional engagement of the sleeve with a workpiece.

Objects, features and advantages of this invention include providing a reliable and economical workpiece holder that further reduces the extent of leakage of pressurized fluid from the fluid chamber through the sleeve of the holder, thereby permitting repeated and long-lasting use of the workpiece holder for continuous machining of various tubular workpieces.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTION OF THE PREFERRED EMBODIMENTS

I. Hydrostatic Chuck Design

First Embodiment

Figure 1:
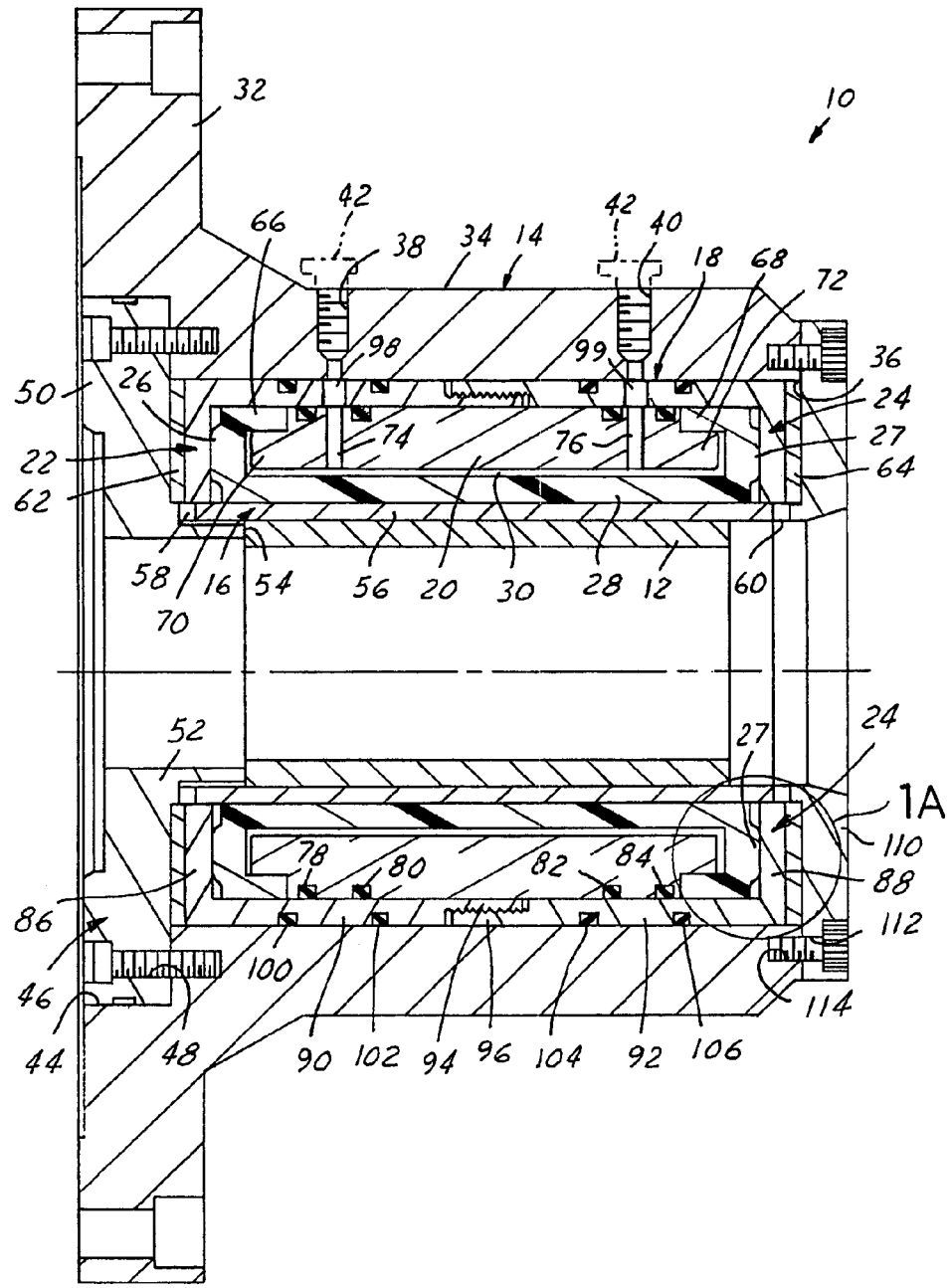
FIG. 1 is a cross-sectional view of a hydrostatic chuck including a cartridge assembly according to a first exemplary embodiment of the present invention.

Referring in more detail to the drawings, FIG. 1 illustrates a hydrostatic workpiece holder, and more specifically, a hydrostatic chuck 10 constructed to firmly hold and accurately locate a tubular workpiece 12 received therein, such as a cast iron cylinder sleeve for an engine. The chuck 10 includes a body 14, a tubular metal sleeve 16 and a first design of a removable cartridge assembly 18 that is carried by the body 14 between the body 14 and the sleeve 16. The cartridge assembly 18 is a self-contained unit that may be assembled to the holder 10 as a separate sub-assembly. The cartridge assembly 18 comprises a retainer 20, two annular sealing members 22, 24 adjustably threaded together, a polymeric member, cylinder, bladder, or ring 28, various shown o-rings, and a fluid chamber 30. The fluid chamber 30 is defined, at least in part, by the bladder 28 and the retainer 20 and receives a fluid therein which can be pressurized. The pressurized fluid is retained within the fluid chamber 30 by a fluid-tight sealing arrangement formed between the sealing members 22, 24 and the bladder 28. Such seals are created by tightening the threadedly joined sealing members 22, 24 so that the sealing members 22, 24 engage annular seals 26, 27 positioned at axial ends of the bladder 28. When the fluid within the fluid chamber 30 is pressurized, a radial force is exerted on the metal sleeve 16, which is urged radially inward into engagement with the workpiece 12.

A representative workpiece 12 is a cast iron sleeve, such as a cylinder liner for an internal combustion engine. Typically, a plurality of cast metal workpieces of the same design have relatively rough surfaces and significant variations in inside and outside diameter and hence, a large displacement of the metal sleeve 16 is needed to firmly hold and accurately locate on center, one at a time, each of a plurality of workpieces 12 on the chuck 10 as they are machined.

As shown in FIG. 1, the chuck body 14 of the chuck 10 includes a radially extending flange 32 constructed to be attached to a machine spindle for co-rotation therewith. The body 14 has a generally cylindrical sidewall 34 with a through bore 36 and a pair of fluid passages 38, 40 through which fluid is supplied to the fluid chamber 30. Preferably, as shown in phantom in FIG. 1, a threaded screw 42 received in each fluid passage 38, 40 provides a piston which can be advanced or retracted by rotation of the screw to apply direct pressure on the fluid in the fluid chamber 30. Alternatively, a pair of pressurized fluid supply tubes or pistons (not shown) may communicate with each fluid passage 38, 40 to supply fluid under pressure to the fluid chamber 30. A counterbore 44 formed in the body 14 receives a stop ring 46, which is attached to the body 14 by a plurality of spaced apart cap screws received through holes 48 in a radially extending flange 50 of the stop ring 46. The stop ring 46 has an annular wall 52 extending into the bore 36 and constructed to provide a stop surface 54 which abuts the workpiece 12 to locate the workpiece 12 within the chuck 10. Alternatively, the workpiece 12 can be located by air registration or other suitable means.

The workpiece 12 is held in the chuck body 14 by the metal sleeve 16. The metal sleeve 16 is an expandable sleeve, which is preferably a split-sleeve or collet. The expandable sleeve 16 includes longitudinally extending slits (not shown) spaced about the circumference of the sleeve 16 to facilitate radial displacement of the sleeve 16. In any case, the metal sleeve 16 is preferably flexible enough to conform to and center an out-of-round workpiece 12 so that workpiece 12 can be machined into a true round condition. The metal sleeve 16 further includes a body portion 56 with equally circumferentially spaced apart tabs 58, 60 extending from opposed ends of the body 56 to allow the sleeve 16 to be located and retained within the chuck body 14. The tabs 58, 60 each comprise castellations that are slidably received in complementary mating recesses or castellations formed in stop ring 46 and an annular nose cap 110 respectively. The design of the nose cap 110 will later be described in more detail. Spacer rings 62, 64 are disposed adjacent to the stop ring 46 and the nose cap 110 and are used to accurately locate and center the metal sleeve 16.

Figure 1A:
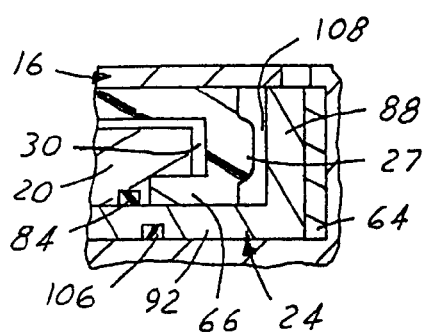
FIG. 1A is fragmentary section of the cartridge assembly of FIG. 1 showing construction of a bladder prior to engagement by a sealing member.
Figure 2:
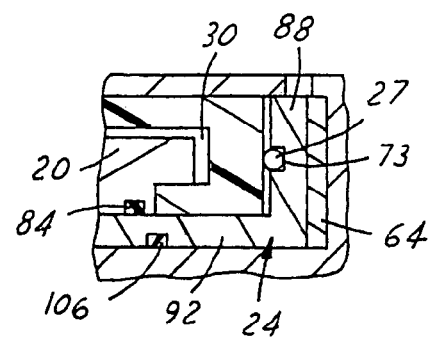
FIG. 2 is a fragmentary section of the cartridge assembly of FIG. 1 showing an alternative configuration of an annular seal between the bladder and the sealing member.

The bladder 28 of the cartridge assembly 18 is generally U-shaped in longitudinal cross section and is made of a rubber material. The rubber material is preferably a substantially 70 durometer material on the Shore A scale, such as a polyurethane, silicone, buty-n, butyl-n, or other suitable material known to one skilled in the art. For purposes of the present invention, the bladder 28 is circumferentially continuous and can be a hollow cylindrical member, ring, or other similar configuration. The bladder 28 has inwardly extending flanges 66, 68 to which outwardly extending shoulders 70, 72 of the retainer 20 are received. The space or gap left between the bladder 28 and the retainer 20 defines the fluid chamber 30. As shown in FIG. 1, the annular seals 26, 27 are protuberances that are integrally formed on the axial ends of the bladder 28. The protuberances are preferably flexible annular bulges of a relatively resilient bladder material that are compressed into sealing engagement with the annular sealing members 22, 24 by pressurized fluid in the chamber 30 and expand when engaged by a hard surface, thereby forming a fluid-tight seal. The compression of the annular seals 26, 27 will be discussed later in conjunction with FIG. 1A. Alternatively, as shown in FIG. 2, the annular seals 26, 27 may be provided as o-rings 71 that are disposed within annular grooves 73 formed in the sealing member 24. The o-ring 71 is compressed into sealing engagement with a flat surface of the bladder 28 by pressurized fluid in the chamber 30 and expand when engaged by a harder surface, thereby forming a fluid tight seal between the bladder 28 and the sealing member 24. An annular groove is also formed in the sealing member 22 to receive an o-ring, which is not shown in FIG. 2.

With reference again to FIG. 1, the retainer 20 is a generally circular annular body, or other similar construction, with two radial passages 74, 76 that communicate with the radial passages 38, 40 of the chuck body 14 to thereby allow the pressurized fluid to pass through the retainer 20 and into the fluid chamber 30. Fluid is prevented from escaping the fluid chamber 30 through the radial passages 74, 76 of the retainer 20 by a pair of spaced apart grooves 78, 80 and 82, 84 formed in the retainer 20 surrounding each radial passage 74, 76. The grooves 78, 80, 82, 84 are constructed to receive a seal, such as an o-ring. To receive the annular axial flanges 66, 68 of the retainer has complementary shoulders in its opposed axial ends.

The threaded sealing members 22, 24 of the cartridge assembly 18 of the first embodiment of the present invention are constructed to engage the annular seals 26, 27, each forming a fluid-tight seal to prevent fluid from leaking from the fluid chamber 30 through the metal sleeve 16. Each sealing member 22, 24 is "L"-shaped and comprises a transversely situated leg section 86, 88 and a longitudinally situated body section 90, 92 respectively. The leg sections 86, 88 are constructed of a relatively hard material such as steel or aluminum that engages the protuberances 26, 27 of the bladder 28 as shown in FIG. 1. The body sections 90, 92 comprise overlapping complementary threaded end portions 94, 96 that allow the sealing members 22, 24 to be axially joined together. Depending upon the desired tightness of the seals formed between the sealing members 22, 24 and the bladder 28, the axial spacing between the legs 86, 88 of the joined sealing members 22, 24 can be adjusted by changing the extent to which the ends 94, 96 are threaded together. The body sections 90, 92 of the sealing members 22, 24 further comprise radial passages 98, 99 that communicate with the radial passages 38, 40 of the chuck body and the radial passages 74, 76 of the retainer 20 to allow the pressurized fluid to pass through to the fluid chamber 30. Located on either side of the radial passages 98, 99 are grooves 100, 102, 104, 106 that are constructed to receive an elastomeric seal, such as an o-ring. The o-ring prevents fluid from escaping from the fluid chamber through the radial passages 98, 99. Alternatively, fluid ports may be provided in the flange 32 to allow pressurized fluid to pass through to the fluid chamber 30.

The seals formed between the sealing members 22, 24 and the bladder 28 will now be described in more detailed with reference to FIGS. 1 and 1A. FIG. 1A depicts a portion of the cartridge assembly 18 of FIG. 1 (circle 1A) prior to tightening the threaded ends 92, 94 of the sealing members 22, 24. Here the annular seal 27, which is a protuberance as shown in FIGS. 1 and 1A, is shown fully formed in its relaxed "bulged" state. The leg section 88 of the sealing member 24 is positioned substantially away from the protuberance 27, thereby exposing a gap 108 between them. The gap 108 is an easy access route for the fluid to escape from the fluid chamber 30 to the metal sleeve 16 and, thus, must be sealed. Referring now to circle 1A in FIG. 1, when the sealing members 22, 24 are further threaded together, the leg 88 engages the protuberance 27 and exerts an axial force on the protuberance 27, which forces the protuberance 27 to be compressed and flattened against the hard surface of the leg section 88, thereby closing the gap 108 (of FIG. 1A). When the protuberance 27 is axially compressed by the leg section 88, the flange 66 of the bladder 28 will also be radially compressed thereby further sealing any spacing (not shown) between the retainer 20 and the sealing member 24. The more force exerted on the protuberance 27, the tighter the seal between the sealing member 24 and the bladder 28 and between the flange 66 and the retainer 20 and member 24. The same holds true for achieving a fluid-tight seal between the sealing member 22 and the bladder 28 and between the flange 68 and the retainer 20 and member 22.

To assemble the chuck 10, the spacer ring 62 is received within the bore 36 of the body 14 abutting the flange 50 of the stop ring 46. The seals formed between the sealing members 22, 24 and the bladder 28 are preferably pre-set and then the cartridge assembly 18 is inserted into the bore 36 in abutting relationship to the spacer ring 62. Then the spacer ring 64 is placed in abutting relationship to the cartridge assembly 28. The annular nose cap 110 is attached to the chuck body 14 by cap screws received through holes 112 in the nose cap 110 and threaded into blind bores 114 in the chuck body 14. The nose cap 110 overlaps and retains the spacer ring 64 in the chuck body 14. The nose cap 110 also retains the metal sleeve 16 within the chuck 10.

In use, the workpiece 12 is received within the metal sleeve 16 with one end abutting the stop surface 54 of the stop ring 46 (or located by air registration). To firmly hold and accurately locate the workpiece 12 within the chuck 10, a substantially incompressible fluid is preferably pressurized by manually advancing the screw 42 so that the fluid flows to the fluid passages 38, 40 of the chuck body 14, through the radial passages 98, 99 of the sealing members 22, 24 and through the radial passages 74, 76 of the retainer 20 to provide pressurized fluid in the fluid chamber 30. The pressurized fluid is preferably a viscous liquid such as oil, water, or the like, but may be any material including a grease. The pressurized fluid produces a radial force urging the bladder 28 into engagement with the metal sleeve 16. The force acting on the metal sleeve 16 displaces or contracts the metal sleeve 16 and urges the sleeve 16 radially inward into firm and frictional engagement with the workpiece 12 to firmly hold and accurately locate the workpiece 12 so that its inner surface may then be machined.

Second Embodiment

Figure 3:
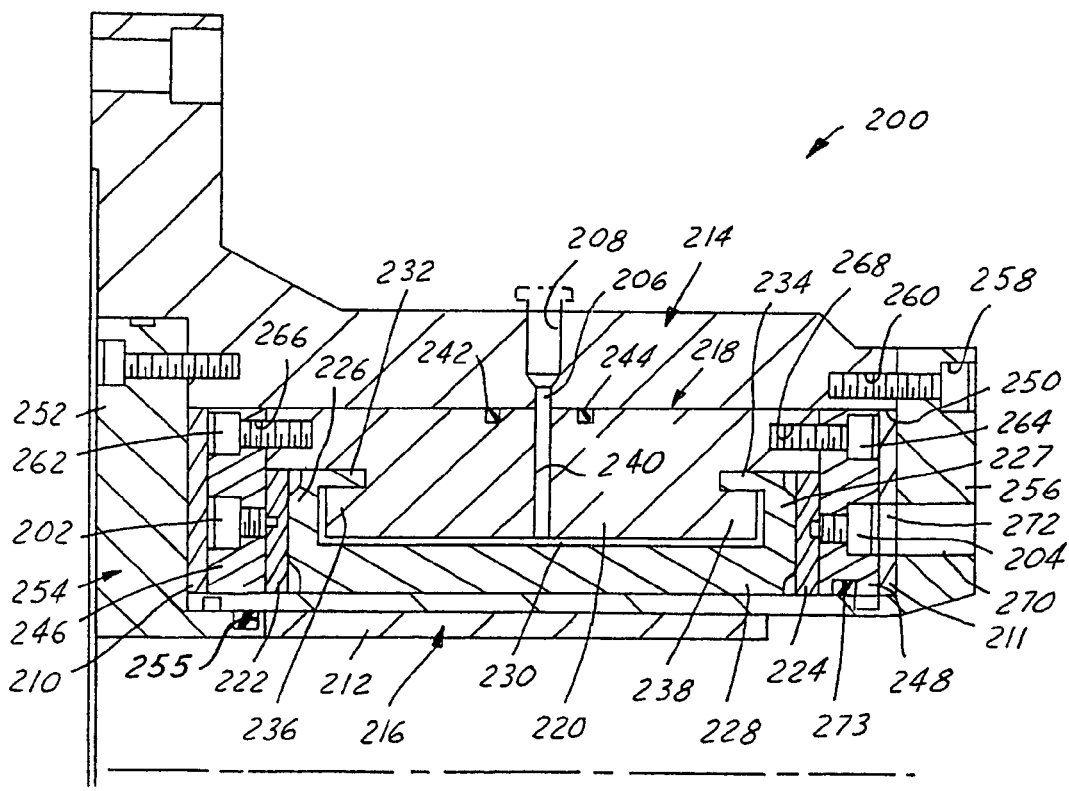
FIG. 3 is a cross-sectional view of a hydrostatic chuck including a cartridge assembly according to a second exemplary embodiment of the present invention.

FIG. 3 provides a hydrostatic chuck 200 comprising a chuck body 214 having a tubular metal sleeve 216 and a second design of a cartridge assembly 218. The designs of the chuck body 214 and the metal sleeve 216 are the same as that described for the first embodiment except that the chuck body 214 comprises a single fluid passage 206 controlled by a threaded screw 208 to supply fluid under pressure from an external source to the fluid chamber 230. In the second design of the cartridge assembly as shown in FIG. 3, more than one fluid passage 206 can be incorporated to supply pressurized fluid to the fluid chamber 230.

The removable cartridge assembly 218 comprises a retainer 220, two sealing plate members 222, 224, a bladder 228, a fluid chamber 230, end plates 246, 248, fasteners 262, 264 and set screws 202, 204. Like that of the cartridge assembly 18 of the first embodiment, the cartridge assembly 218 is a self-contained unit that may be assembled to the holder 200 as a separate sub-assembly. The fluid chamber 230 is defined, at least in part, by the bladder 228 and the retainer 220 and receives a pressurized fluid. The pressurized fluid is retained within the fluid chamber 230 by a fluid-tight sealing arrangement formed between the sealing plates 222, 224 and the bladder 228 by adjusting the sealing plates axial spacing between the sealing plates 222, 224 by advancing a plurality of equally circumferentially spaced apart set screws 202, 204 so that the sealing plates 222, 224 engage annular seals 226, 227 shown as protuberances formed on axial ends of the bladders 228. When the fluid chamber 230 is filled with the pressurized fluid, a force is exerted on the metal sleeve 216, which expands into engagement with a workpiece 212.

As shown in FIG. 3, the bladder 228 is generally U-shaped in cross-section and comprises inwardly extending flanges 232, 234 to which outwardly extending shoulders 236, 238 of the retainer 220 are received. The space between the bladder 228 and the retainer 220 defines the fluid chamber 230. The annular seals 226, 227 shown as protuberances in FIG. 3 are integrally formed on axial ends of the bladder 228. The protuberances 226, 227 are flexible bulges of bladder material that are resiliently compressed when engaged by the sealing plates 222, 224, thereby forming a fluid-tight seal therebetween. Alternatively, the annular seals 226, 227 may be provided as o-rings disposed within annular grooves formed in the sealing members 222, 224.

The retainer 220 comprises a radial passage 240 that communicates with the radial passage 206 of the chuck body 214. The radial passage 240 allows the pressurized fluid to pass through the retainer 220 and into the fluid chamber 230.

Fluid is prevented from escaping the fluid chamber 230 through the radial passage 240 of the retainer 220 by a pair of seals such as o-rings received in spaced apart grooves 242, 244 formed in the retainer 220 surrounding the radial passage 240.

The sealing plates 222, 224 of the cartridge assembly 118 are constructed to engage the protuberances 226, 227 of the bladder 228, each forming a fluid-tight seal to prevent fluid from leaking from the fluid chamber 230 through the metal sleeve 216. The sealing plates 222, 224 are generally flat rings or washers incorporated in the cartridge assembly 218 between the bladder 228 and end plates 246, 248. The sealing plates 222, 224 have surfaces made of a hard material such as steel that engage the protuberances 226, 227 of the bladder 228 by tightening the set screws 202, 204. An axial force is then exerted on the bladder 218 as the protuberances 226, 227 flatten. The end plates 246, 248 abutting the sealing plates 222, 224 are connected to the retainer 220 by cap screws 262, 264 in counterbores 266, 268. Since the axial forces exerted on the bladder 228 derive from two separate sources (i.e., set screws 202, 204), the compression of the ring 228 and hence tightness of the seals between the sealing plates 222, 224 and the bladder 228 can be adjusted at the time of manufacture of the chuck 200 or in the field where the chuck 200 is being used in service.

To assemble the chuck 200, a spacer ring 210 is received within a bore 250 of the body 214 abutting a flange 252 of a stop ring 254. An o-ring is provided in an annular groove 255 formed into the stop ring 254. The o-ring is preferably hollow so that it can be easily compressed. The o-ring prevents contamination from entering the workholder and disrupting the loading of the workpiece thereto. The set screws 202 are preset prior to inserting the cartridge assembly 218 into the bore 250. The set screws 204 can be preset or can be adjusted after insertion of the cartridge assembly 218 in the bore 250. The cartridge assembly 218 is then received within the bore 250 between the spacer ring 210 and a second spacer ring 211 having access holes 272 formed therein. The access holes 272 of the spacer ring 211 align with the set screws 202. An o-ring, preferably a hollow o-ring, is provided in an annular groove 273 formed into the end plate 248 of the cartridge assembly 218 to, again, prevent contamination from entering the workholder and disrupting the loading of the workpiece thereto. Next, the metal sleeve 216 is disposed within the spacer rings 210, 211. An annular nose cap 256 is then attached to the body 214 by bolts or screws received through holes 258 in the nose cap 256 and threaded into blind bores 260 in the body 214. The nose cap 256 has access holes 270 that are aligned with the access hole 272 formed into the spacer ring 211. Thus, the set screws 204 can be accessed through the aligned holes 270 and 272 after the cartridge assembly 218 has been inserted into the chuck body 214. This allows the operator to make adjustments to the tightness of the seals without having to disassemble the chuck 200. The nose cap 256 overlaps and retains the spacer ring 211 in the body 214. The nose cap 256 also retains the metal sleeve 216 within the chuck 200.

II. Hydrostatic Arbor Design

Third Embodiment

Figure 4:
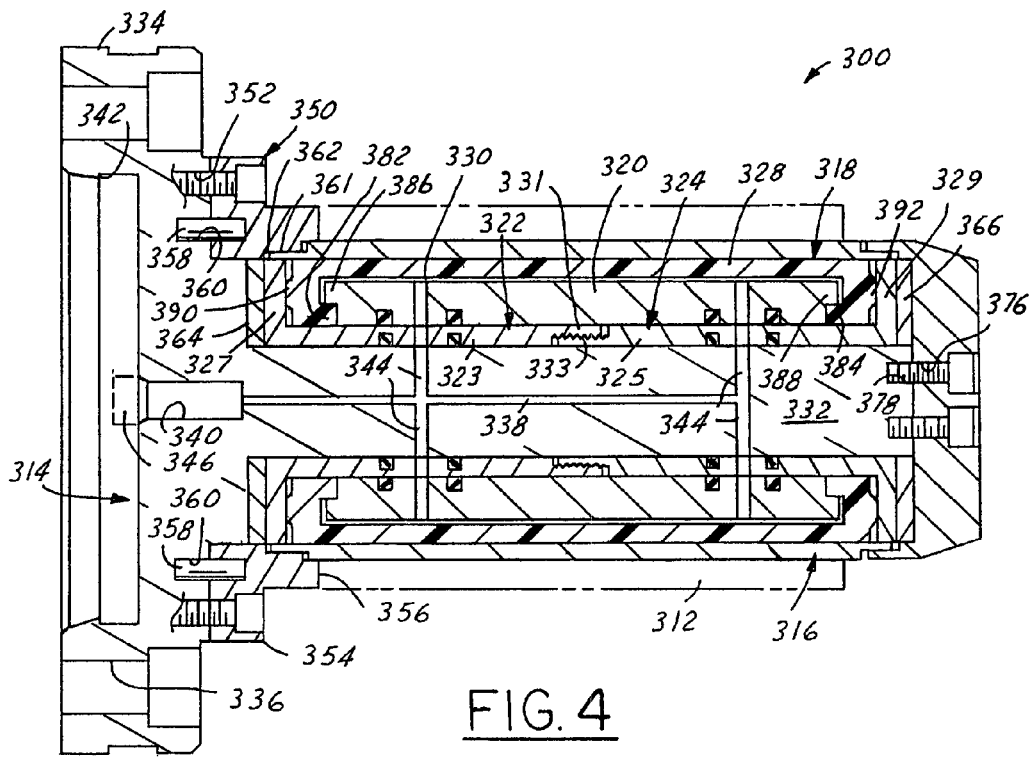
FIG. 4 is a cross-sectional view of a hydrostatic arbor including a cartridge assembly according to a third exemplary embodiment of the present invention.

FIG. 4 illustrates a hydrostatic arbor 300 constructed to firmly hold and accurately locate a tubular workpiece 312 received thereon. The arbor 300 comprises a body 314, a tubular metal sleeve 316 and a removable cartridge assembly 318 carried by the body 314. The cartridge assembly 318 has the same general design as that of the cartridge assembly 18 disclosed in the first embodiment above. The removable cartridge assembly 318 comprises a retainer 320, two sealing members 322, 324, a bladder 328 and a fluid chamber 330. The metal sleeve 316 is acted on by a pressurized fluid received in the fluid chamber 330 to expand or move the metal sleeve 316 radially outward into firm frictional engagement with the tubular workpiece 312.

The arbor body 314 has a cylindrical shank 332 and a radially extending mounting flange 334 at one end. The body 314 is constructed to be mounted on a spindle of a machine tool (not shown) for co-rotation with the spindle and may be mounted on the spindle by suitable cap screws received through circumferentially spaced bores 336 through the flange 334. The body 314 has a blind bore or fluid passage 338 extending into the shank 332, a first counterbore 340 and a second counterbore 342. The fluid passage 338 is constructed to be filled with the fluid and communicates with the fluid chamber 330 by branch passages 344 extending through the body 314 generally transversely to the fluid passage 338.

An automatic pressurized fluid supply assembly (not shown) has one end of a supply tube constructed to be received through the machine spindle and into the counterbore 340 in the arbor body 314 with a bushing received in the spindle. The supply tube rotates with the arbor 300 in use. Alternatively, a set screw 346 (as shown in phantom in FIG. 4) may be threadably received in the fluid passage 338 and may be manually displaceable to either directly pressurize the fluid in the fluid passage 338 and fluid chamber 318. In either construction, pressurized fluid is provided to the fluid chamber 330 as desired.

An annular stop ring 350 is connected to the body 314 by a plurality of circumferentially spaced bolts or cap screws received through complimentary bores 352 through a radially extending flange 354 of the stop ring 350. To locate the workpiece 312 relative to the arbor body 314, the stop ring 350 has an annular flat face 356 which the workpiece 312 abuts when received on the arbor 300. To locate the stop ring 350 relative to the body 314, a dowel 358 is received in each of a plurality of circumferentially spaced blind bores 360 in both the stop ring 350 and the body 314. To retain the metal sleeve 316 adjacent the stop ring 350, the sleeve 316 preferably has axially extending tabs 361 comprising castellations that are received in complementary castellations in the stop ring 350 to drive the sleeve 316 for rotation as the arbor 300 rotates. Thus, the sleeve 316 is permitted to move radially without being restrained by the stop ring 350.

The cartridge assembly 318 of FIG. 4 is substantially similar to the cartridge assembly 18 of FIG. 1 except that the cartridge assembly 318 is designed for radially outward expansion of the sleeve 316, whereas the cartridge assembly 18 is designed for radially inward for contraction of the sleeve 16. Briefly, the cartridge assembly 318 comprises a retainer 320, two threaded sealing members 322, 324, a bladder 328 and a fluid chamber 330. The bladder comprises inwardly extending flanges 382, 384 to which outwardly extending shoulders 386, 388 of the retainer 320 are received. The spacing left between the bladder 328 and the retainer 320 defines the fluid chamber 330. The threaded sealing members 322, 324 are "L"-shaped, where each member comprises a body section 323, 325 and a leg section 327, 329, respectively. The body sections 323, 325 comprise complementary threaded ends 331, 333 that allow the sealing members 322, 324 to be axially adjustably joined together. The leg sections 327, 329 of the sealing members 322, 324 engage annular seals 390, 392 which are shown as protuberances formed at axial ends of the bladder 328. As the threaded sealing members 322, 324 are tightened, an axial force is exerted on the bladder 328, thereby causing the annular seals 390, 392 to flatten. Fluid-tight seals are, thus, created between the sealing member 322 and the bladder 328 and between the sealing member 324 and the bladder 328.

To assemble the arbor 300, the stop ring 350 is connected to the radial flange 334 of the arbor body 314 and an annular spacer ring 364 is disposed on the shaft 332 of the arbor body 314. Next, the cartridge assembly 318 is disposed on the shaft 332 adjacent the spacer ring 364. A second spacer ring 366 is then received on the shaft 332 and a nose cap 374 is then bolted to the shaft 332 with two or more screws received in holes 376 through the nose cap 374 and threaded into blind bores 378 in the shaft 332.

In use, the workpiece 312 is disposed over the metal sleeve 316 until it engages the face 356 of the stop ring 350. To firmly hold the workpiece 312 on the arbor 300, fluid under pressure is provided from an external source, such as through a supply tube, the passages 338, 340 in the arbor body 314 and to the fluid in the fluid chamber 330. The pressurized fluid radially outwardly expands the bladder 328 which firmly engages and radially outwardly expands or flexes the metal sleeve 316 to urge the metal sleeve 316 into firm frictional engagement with the workpiece 312 to hold and accurately locate the workpiece 312 for machining. To remove the workpiece 312 after it has been machined, the pressure of the fluid supplied to the arbor is decreased by relieving the pressure of the fluid in the fluid chamber 330, which relaxes the metal sleeve 316.

Fourth Embodiment

Figure 5:
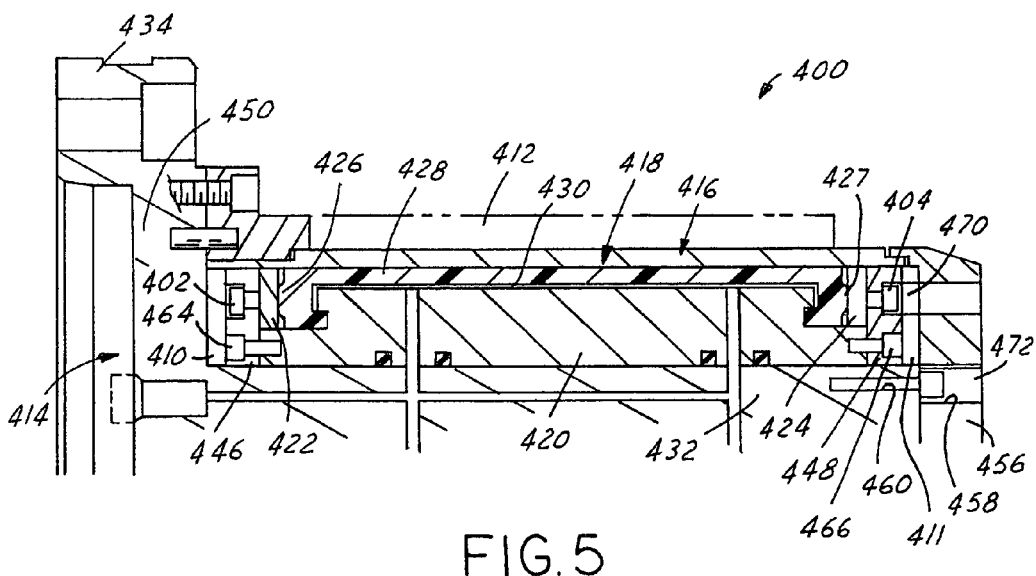
FIG. 5 is a cross-sectional view of a hydrostatic arbor including a cartridge assembly according to a fourth exemplary embodiment of the present invention.

FIG. 5 illustrates a hydrostatic arbor 400 comprising a body 414 having a tubular metal sleeve 416 and a cartridge assembly 418 carried by the body 414. The cartridge assembly 418 has the same general design as that of the cartridge assembly 218 disclosed in the second embodiment of the present invention. The cartridge assembly 418 comprises a retainer 420, two sealing plates 422, 424, a bladder 428, a fluid chamber 430, end plates 446, 448, fasteners 464, 466 and set screws 402, 404. The metal sleeve 416 is acted on by a pressurized fluid received in the fluid chamber 430 to expand the metal sleeve 416 into engagement with a tubular workpiece 412.

The fluid chamber of the cartridge assembly 418 is defined, at least in part, by the bladder 428 and the retainer 420 and receives a pressurized fluid. The pressurized fluid is retained within the fluid chamber 430 by a fluid-tight sealing arrangement formed between the sealing plates 422, 424 and the bladder 428 by adjusting the sealing plates 422, 424 by the set screws 402, 404. When the set screws 402, 404 are tightened, the sealing plates 422, 424 engage annular seals 426, 427, which are shown as protuberances formed on axial ends of the bladder 428.

The arbor 400 in FIG. 5 is assembled as follows. A stop ring 450 is connected to a radial flange 434 of the arbor body 414 and an annular spacer ring 410 is disposed on a shank 432 of the arbor body 314. Next, the cartridge assembly 418 is disposed on the shank 432 adjacent the spacer ring 410. A second spacer ring 411 is then received on the shaft 432 and has access holes 470 aligned with the set screws 404 of the cartridge assembly 418. A nose cap 456 is then bolted to the shaft 432 with two or more screws received in holes 458 through the nose cap 456 and threaded into blind bores 460 in the shaft 432. The nose cap 456 also has access holes 472 aligned with the access holes 470 of the spacer ring 411. Thus, the set screws 404 can be accessed through the aligned holes 470, 472 after the cartridge assembly 418 has been inserted into the arbor body 414. This allows the operator to make adjustments to the tightness of the seals without having to disassemble the arbor 400.

The hydrostatic holders 10, 200, 300, 400 according to the present invention enable a relatively large displacement of a metal sleeve 16, 216, 316, 416, respectively, to urge the metal sleeve 16, 216, 316, 416 into firm frictional engagement with the workpiece 12, 212, 312, 412. The diameter of the metal sleeve may change about 0.10 to 0.35 of an inch to firmly hold the workpiece as an example only. In the holders 10, 200, the workpiece 12, 212 is received in a hydrostatic chuck and its metal sleeve 16, 216 is radially outwardly displaced to firmly engage the inner surface of the workpiece 12, 212 so that its outer surface may be machined. In the holder 300, 400, the metal sleeve 316, 416 is radially inwardly displaced to firmly engage the outer surface of the workpiece 12 so that its inner surface may be machined. The relatively large displacement of the metal sleeve 16, 216, 316, 416 is necessary to firmly hold cast workpieces such as cylinder liners for internal combustion engines which as cast have a relatively rough surface finish and substantial variation in their inside and outside diameters.

Also, in accordance with the present invention, fluid leakage from the fluid chamber through the sleeve is reduced by providing suitable fluid-tight sealing arrangements between the bladder and the sealing plates of the cartridge assembly in all workpiece holders described herein. Both of the cartridge assembly designs of the present invention can be assembled prior to inserting it within the workpiece holder body and require very few parts to assemble, thereby making the manufacturing and assembly of the workpiece holder economical and efficient. As such, repeated and continuous use of the workpiece holders is available for continuous machining of various tubular workpieces.

While the forms of the invention herein disclosed constitute presently preferred embodiments, many others are possible. It is not intended herein to mention all the possible equivalent forms or ramifications of the invention. It is understood that terms used herein are merely descriptive, rather than limiting, and that various changes may be made without departing from the spirit and scope of the invention as defined by the following claims.

The invention claimed is:

1. A workpiece holding apparatus comprising:
a body;
a cartridge assembly carried by said body, said cartridge assembly comprising:
 a bladder;
 a retainer supporting said bladder;
 a fluid chamber for housing a fluid, said fluid chamber at least partially defined by said bladder;
 at least one sealing member positioned axially adjacent said bladder, wherein said at least one sealing member comprises a body portion with a threaded end for providing axially adjustable engagement with said bladder; and
 at least one annular seal positioned at an axial end of said bladder, between said bladder and said sealing member; and
a sleeve that holds a workpiece when the fluid in the chamber is pressurized.

2. The workpiece holding apparatus of claim 1 wherein said at least one annular seal is an integral annular protuberance provided on said axial end of said bladder.

3. The workpiece holding apparatus of claim 1 wherein said at least one annular seal is a separate O-ring positioned between said axial end of said bladder and said at least one sealing member.

4. The workpiece holding apparatus of claim 1 wherein said bladder is composed of a substantially 70 durometer material selected from the group consisting of polyurethane, silicone, buty-n, and butyl-n.

5. The workpiece holding apparatus of claim 1 wherein said at least one annular seal is compressed against said at least one sealing member to create a seal as axial pressure is exerted on said bladder.

6. The workpiece holding apparatus of claim 1 further comprises at least one annular spacer ring supporting said at least one sealing member.

7. The workpiece holding apparatus of claim 1 wherein said at least one sealing member comprises a transversely extending leg portion that contacts said at least one annular seal.

8. The workpiece holding apparatus of claim 7 wherein said threaded end of said body portion of said sealing member is adapted to receive a substantially complementary threaded end of another body portion of another sealing member that, when engaged and tightened, exerts axial force on said bladder.

9. The workpiece holding apparatus of claim 1 wherein said retainer carries at least one seal disposed between said retainer and said body to prevent fluid from leaking between said retainer and said body.

10. The workpiece holding apparatus of claim 1 further comprising at least one seal disposed between said body and said at least one sealing member to prevent fluid from leaking between said body and said at least one sealing member.

11. The workpiece holding apparatus of claim 1 wherein said pressurized fluid exerts a radially outward force against said bladder to the sleeve for engagement with said workpiece.

12. The workpiece holding apparatus of claim 1 wherein said pressurized fluid exerts a radially inward force against said bladder to the sleeve for engagement with said workpiece.

13. The workpiece holding apparatus of claim 1 wherein said at least one sealing member is adjustable after said cartridge assembly has been assembled to said body.

14. A workpiece holding apparatus comprising: a body; a cartridge assembly carried by said body, said cartridge assembly comprising: a bladder; a retainer supporting said bladder; a fluid chamber for housing a fluid, said fluid chamber at least partially defined by said bladder; at least one sealing member positioned axially adjacent said bladder, wherein said at least one sealing member is adapted for axially adjustable engagement with said bladder; and at least one annular seal positioned at an axial end of said bladder, between said bladder and said sealing member; and a sleeve that holds a workpiece when the fluid in the chamber is pressurized, further comprising an end plate comprising at least one hole constructed to receive a set screw for applying axial force against said at least one sealing member to allow said at least one sealing member to engage said at least one annular seal.

15. The workpiece holding apparatus of claim 14 wherein said end plate further comprises at least one other a fastener for attaching said at least one hole constructed to receive a fastener for attaching said end plate to said retainer.

16. The workpiece holding apparatus of claim 15 further comprising a nose cap connected to said body, said nose cap comprising a hole aligned with said hole of said end plate, whereby said aligned holes of said end plate and said nose cap allow accessing said set screw for adjusting axial pressure exerted on said bladder.

17. A cartridge assembly for a workpiece holding apparatus comprising: a bladder; a retainer supporting said bladder; a fluid chamber at least partially defined between said bladder and said retainer; at least one sealing member positioned axially adjacent said bladder, wherein said at least one axial sealing member comprises a body portion with a threaded end or providing axially adjustable engagement with said bladder; and at least one annular seal positioned at an axial end of said bladder, between said bladder and said sealing member.

18. The cartridge assembly of claim 17 wherein said at least one annular seal comprises at least one integral axial annular protuberance that is compressed against said at least one sealing member to create a seal as axial pressure is exerted on said bladder.

19. The cartridge assembly of claim 17 wherein said bladder is composed of a substantially 70 durometer material selected from the group consisting of polyurethane, silicone, buty-n, and butyl-n.

20. The cartridge assembly of claim 17 wherein said at least one sealing member comprises a transversely extending leg portion that contacts said axial end of said bladder.

21. The cartridge assembly of claim 20 wherein said threaded end of said body portion of said at least one sealing member is adapted to receive a substantially complementary threaded end of another body portion of another sealing member that, when engaged and tightened, exerts axial force on said bladder.

22. The cartridge assembly of claim 17 wherein said at least one annular seal includes at least one of an integral annular protuberance provided on said bladder or a separate O-ring disposed between said retainer and said at least one sealing member to prevent fluid from leaking between said retainer and said sealing member.

23. A cartridge assembly for a workpiece holding apparatus comprising; a bladder; a retainer supporting said bladder; a fluid chamber at least partially defined between said bladder and said retainer; at least one sealing member positioned axially adjacent said bladder, wherein said at least one sealing member is adapted for axially adjustable engegement with said bladder, and at least one annular seal positioned at an axial end of said bladder, between said bladder and said sealing member, further comprising an end plate including at least one hole constructed to receive a set screw for applying axial force against said at least one sealing member to allow said at least one sealing member to engage said bladder.

24. The cartridge assembly of claim 23 wherein said end plate carries a fastener for attaching said end plate to said retainer.

* * * * *

UNITED STATES PATENT AND TRADEMARK OFFICE
CERTIFICATE OF CORRECTION

PATENT NO. : 7,316,403 B2
APPLICATION NO. : 11/020818
DATED : January 8, 2008
INVENTOR(S) : William M. Andre Page 1 of 1

It is certified that error appears in the above-identified patent and that said Letters Patent is hereby corrected as shown below:

Title page, item [73] should read as follows -- Assignee: Hydra-Lock Corporation --.

Col 9, Line 17, delete "comprises" and insert -- comprising --.

Col 12, Lines 3-4, delete "a fastener for attaching said at least one".

Col 12, Line 17, delete "or" and insert -- for --.

Col 12, Line 51, delete "engegement" and insert -- engagement --.

Signed and Sealed this

Twenty-eighth Day of October, 2008

JON W. DUDAS
*Director of the United States Patent and Trademark Office*